United States Patent [19]

Bourrieres

[11] Patent Number: 4,878,984
[45] Date of Patent: Nov. 7, 1989

[54] APPARATUS FOR FORMING A FILAMENT-WOUND STRUCTURE ON A CYLINDRICAL POLE

[75] Inventor: Pierre Bourrieres, Cahors, France

[73] Assignee: Manufacture d'Appareillage Electrique de Cahors, Cahors, France

[21] Appl. No.: 195,678

[22] Filed: May 11, 1988

Related U.S. Application Data

[62] Division of Ser. No. 865,769, May 22, 1986, Pat. No. 4,769,967.

[30] Foreign Application Priority Data

May 28, 1985 [FR] France ............... 85 07952

[51] Int. Cl.$^4$ ............... B31C 13/00; B65H 81/00
[52] U.S. Cl. ............... 156/431; 156/429; 156/430; 156/169
[58] Field of Search ............... 156/172, 187, 425, 428, 156/429, 430, 431, 432, 180, 169; 242/157 R, 157.1

[56] References Cited

U.S. PATENT DOCUMENTS 4,145,740  3/1979  McClean ............... 156/425 X

FOREIGN PATENT DOCUMENTS 3039141  5/1982  Fed. Rep. of Germany .
2029772  3/1980  United Kingdom ............... 428/375
8400351  2/1984  PCT Int'l Appl. .

Primary Examiner—Michael W. Ball
Assistant Examiner—Jeff H. Aftergut
Attorney, Agent, or Firm—Young & Thompson

[57] ABSTRACT

Apparatus whereby a filament web impregnated with resin in the unpolymerized state is fed to a pole (1) at a predetermined angle ($\alpha$) with respect to a plane perpendicular to this latter. The pole (1) is drawn in rotation about its axis (X–X') and the filament web is displaced along the pole from the bottom end to the top end thereof in a direction parallel to the axis of the pole while this latter is being driven in rotation. A plurality of parallel fiber slivers (8, 9, 10) spaced a distance apart are fed simultaneously to the pole (1) in a plurality of layers. The spacing between the slivers is progressively increased during displacement of the slivers between the bottom end and the top end of the pole and progressively decreased in the opposite direction. Similarly, the angle of the slivers to a plane perpendicular to that axis is progressively increased and decreased in the same directions that the spacing is increased and decreased. The apparatus is useful for forming a reinforcement wound structure of filaments on a cylindrical pole (1) of plastic material, the wound structure of filaments having a density which progressively decreases from the bottom end to the top end of the pole in each layer.

5 Claims, 4 Drawing Sheets

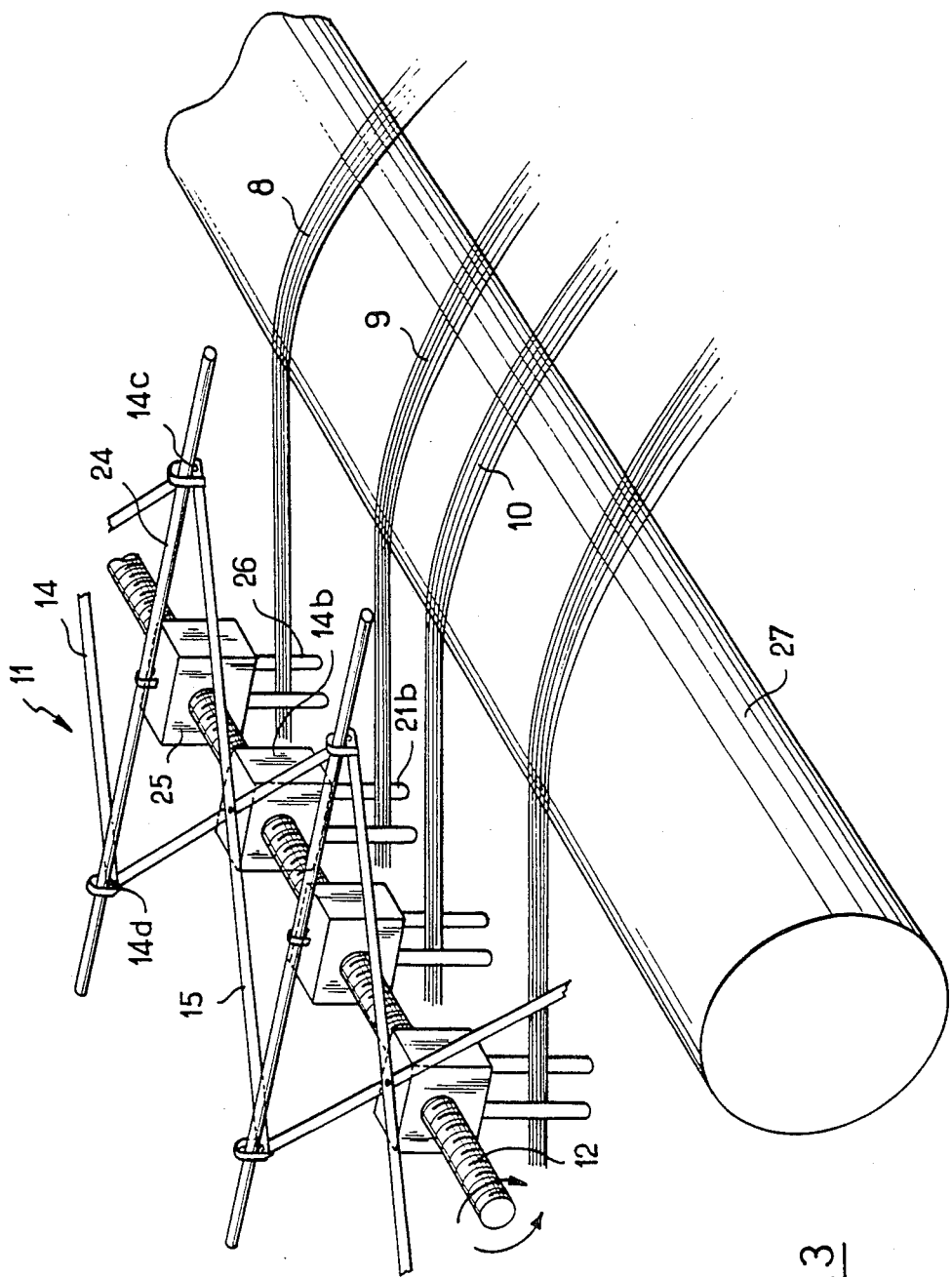

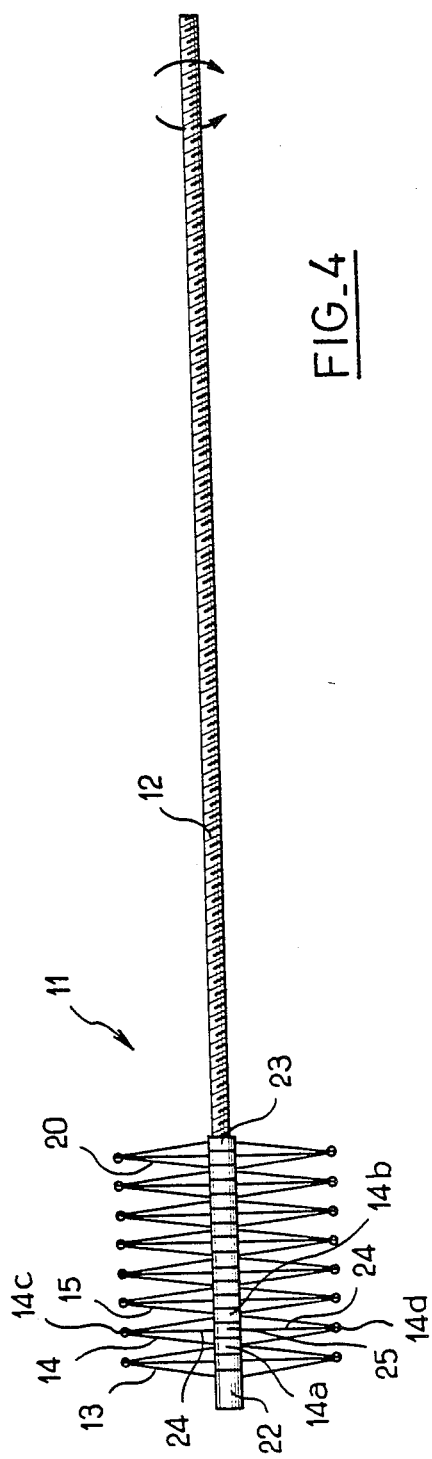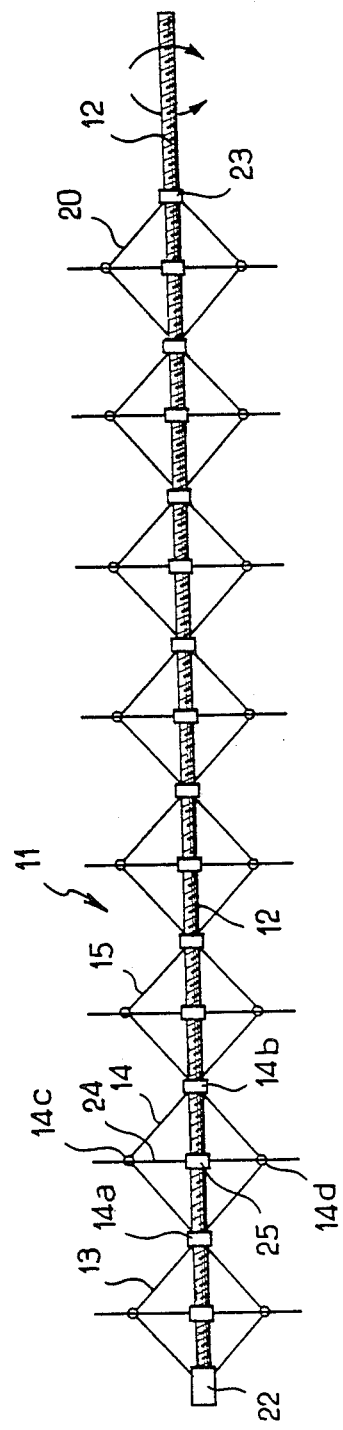

APPARATUS FOR FORMING A FILAMENT-WOUND STRUCTURE ON A CYLINDRICAL POLE

This application is a division of application Ser. No. 865,769 filed May 22, 1986, now U.S. Pat. No. 4,769,967.

BACKGROUND OF THE INVENTION

1. Field of the Invention

The present invention relates to a pole of plastic material which is primarily intended to support electric power transmission lines and is reinforced by a wound structure of fibers or so-called filaments disposed tangentially with respect to the principal axis.

The invention is also directed to a device for forming a filament-wound structure on said pole.

2. Description of the Prior Art

Poles of plastic material filled with glass fibers extending in the longitudinal direction of the pole are already known. The cross-sectional area of the pole decreases from the lower end to the upper end as a function of the bending moment which typically appears in poles of this type.

As a general rule, power-line poles of the type just mentioned are thus of frusto-conical shape.

Known power poles of plastic material which fall into the same class but are constructed in accordance with a different design are reinforced externally by a filament-wound structure. In the known designs, the filament-winding operation is performed by means of a filament web impregnated with resin in the unpolymerized state, the filament web being fed to the frusto-conical pole at a predetermined angle with respect to this latter by driving the pole in rotation about its axis and by subjecting the filament web to a displacement along the pole from the lower end to the upper end in a direction parallel to the axis of the pole while this latter is being driven in rotation. In the known designs, the filament winding forms a constant pitch from one end of the pole to the other, with the result that the filament density is uniformly distributed over the entire length of the pole.

The fibers constituting a filament are strongly bonded to the plastic pole by polymerization of the resin with which said fibers are coated.

As disclosed in German patent Application No. 3,039,141 filed by Vulkan Werk, another known type of plastic pole was proposed in particular for supporting electric power transmission lines and was reinforced by a filament-wound structure. In this case the density of fibers of the winding decreased progressively from the bottom to the top of the pole. In accordance with the teachings of this patent Application, however, the pole is made up of pole elements assembled together in end-to-end relation and the filament winding serves essentially to carry out interassembly of pole elements placed end to end.

SUMMARY OF THE INVENTION

The object of the present invention is to propose an effective low-cost solution for constructing plastic poles reinforced externally by a filament-wound structure.

In accordance with the invention, the plastic pole which is intended in particular to support electric power transmission lines and is reinforced by a wound structure of tangential fibers referred-to as filaments, the filament density of the wound structure being progressively lower from the bottom to the top end of the pole, is essentially fabricated in one piece by extrusion under tension.

Preferably, the plastic material of the pole is filled with fibers which extend in the longitudinal direction of said pole.

In accordance with the invention, a single-piece pole of cylindrical shape which already has high mechanical strength in the longitudinal direction is formed in an initial and economically simple operation which consists of extrusion under tension, also known as extrusion-drawing or "pultrusion".

It must be understood that the term "cylindrical" is used in this specification in its broadest sense and thus includes any cross-section having convex external shapes.

After reinforcement with a continuous filament having a winding density which decreases progressively from the bottom upwards, the pole has the same mechanical characteristics as a pole having a cross-sectional area which decreases from the bottom to the top end and is wholly suited for supporting electric power transmission lines.

In an advantageous embodiment of the invention, a winding angle $\alpha$ with respect to a plane perpendicular to the axis X—X' of the pole increases progressively from the lower end to the upper end of said pole. This modification of the filamentwinding angle makes it possible at the same time to modify the density of distribution of filaments along the length of the pole.

In a preferred embodiment of the invention, the pole comprises at least two superposed wound-filament layers, the filament-winding angle of the second layer being reverse to the filament-winding angle of the first layer.

As a result of overlaying, it is thus possible to compensate for discontinuities arising from the fact that, in the first layer of the winding, the filament webs are relatively spaced over at least part of the height of the pole.

In accordance with another distinctive feature of the present invention, the top portion of the pole is covered by an end-cap of electrically insulating material which comprises supports for attaching the electric power transmission lines, the filament-winding density at the level of the transmission-line supports in that portion of the pole which is covered by said end-cap being higher than the filament-winding density in the zones located between said supports.

The invention thus makes it possible to reinforce the pole in zones which are located opposite to the transmission-line supports and in which the pole is subjected to relatively high mechanical stresses.

According to another aspect of the invention, the device for forming a filament-wound structure on a cylindrical pole in accordance with the invention, comprising means whereby a filament web impregnated with resin in the unpolymerized state is fed to the pole at a winding angle $\alpha$ with respect to a plane perpendicular to the axis X—X' of the pole, means for driving the pole in rotation about its axis and means for displacing the filament web along the pole from the lower end to the upper end thereof in a direction parallel to the axis of the pole while this latter is being driven in rotation, is distinguished by the fact that said device comprises means whereby a plurality of parallel fiber slivers are fed simultaneously to the pole and means whereby the spacing between said slivers is progressively increased during displacement of said slivers between the lower end and the upper end of the pole.

BRIEF DESCRIPTION OF THE DRAWINGS

Other features of the invention will be more apparent to those skilled in the art upon consideration of the following description and accompanying drawings, wherein:

FIG. 3 is a view in perspective showing part of the device in accordance with the invention;

FIG. 4 is a plan view showing part of the device, the deformable parallelograms of the device being in an initial position in which the fiber slivers are wound in very closely spaced relation;

FIG. 5 is a plan view which is similar to FIG. 4, the deformable parallelograms being in an expanded position in which the fiber slivers are wound in widely spaced relation;

DESCRIPTION OF THE PREFERRED EMBODIMENTS

Figures 1, 2:
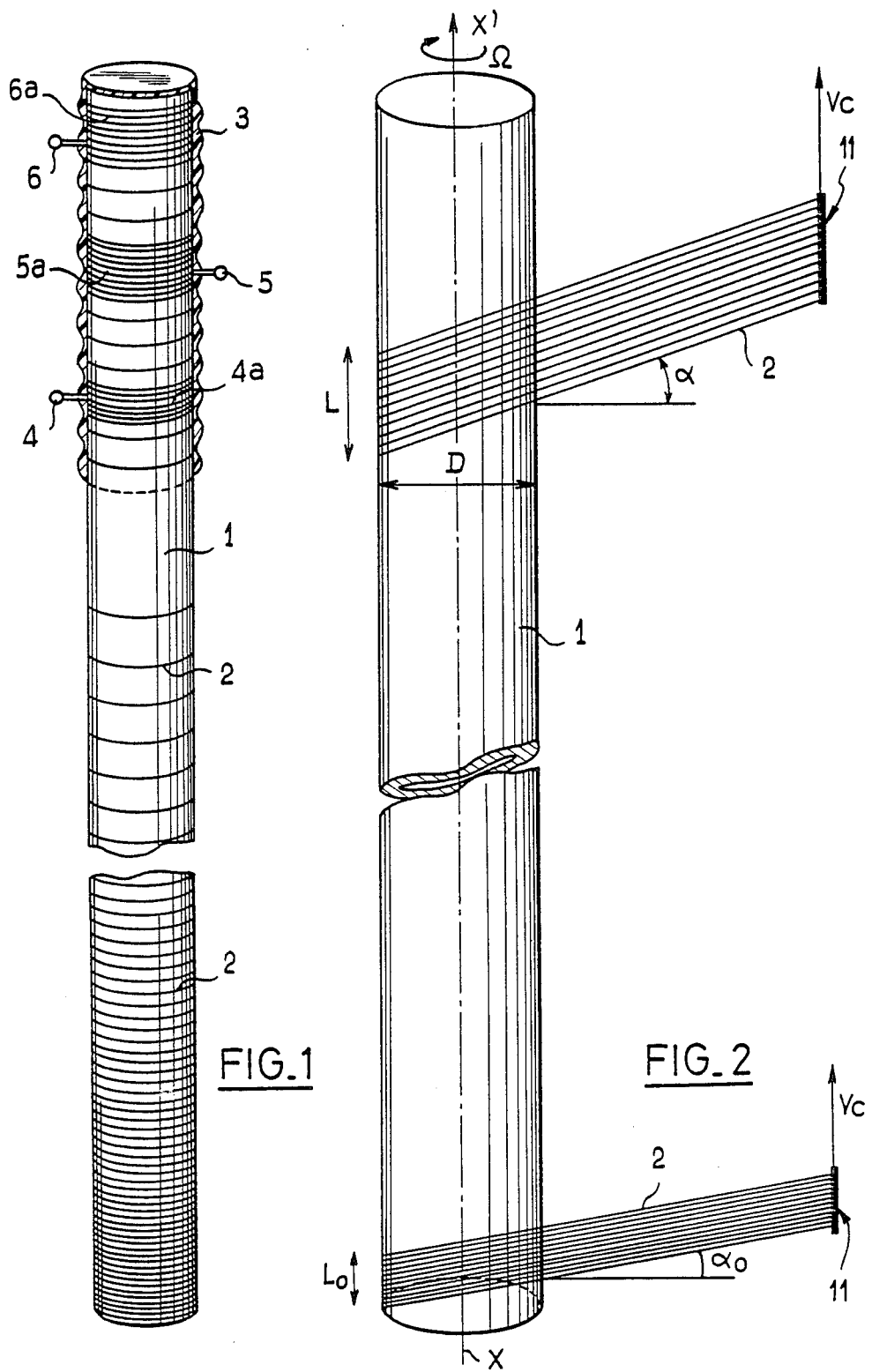
FIG. 1 is a fragmentary view in elevation showing a reinforced pole in accordance with the invention.
FIG. 2 is a schematic fragmentary view of the pole illustrating the application of the fiber reinforcement by means of the device in accordance with the invention.

In the embodiment of FIG. 1, the pole 1 for supporting electric power transmission lines is of plastic material filled with fibers which extend longitudinally within the pole.

Said pole 1 is a cylindrical tube fabricated for example by extrusion under tension (pultrusion) and reinforced externally by filaments 2 of a winding.

In accordance with the invention, the filament density of the winding decreases progressively from the bottom to the top of the pole 1, thus having the effect of giving the pole a slightly frusto-conical shape.

The filament density distribution is such that the pole exhibits maximum resistance to bending and buckling at its lower end whereas the bending resistance decreases progressively towards the upper end, as is the case with conventional frusto-conical poles.

As shown in FIG. 2, the angle $\alpha_o$, $\alpha$ of winding of filaments 2 with respect to a plane perpendicular to the axis X—X' of the pole 1 increases progressively from the bottom end to the top end of the pole.

Preferably, the cylindrical pole 1 is covered with at least two superposed layers of wound filaments 2, the filament-winding angle of the second layer being reverse to the filament-winding angle ($\alpha_o$, $\alpha$) of the first layer.

In the embodiment of FIG. 1, it is further apparent that the top portion of the pole 1 is covered by an end-cap 3 of electrically insulating material such as a silicone resin having a wavy lateral surface provided with supports 4, 5, 6 for attaching electric power transmission lines. The end portion of the pole 1 which is covered by said end-cap 3 is provided at the level of the transmission-line supports 4, 5, 6 with zones 4a, 5a, 6a in which the filament-winding density is higher than in the zones located between said supports 4, 5, 6. Furthermore, the zone 6a which is nearest the top end of the pole 1 has a higher filament density than the zones 5a and 4a which are located at a greater distance from said top end.

The device in accordance with the invention for forming a filament-wound structure 2 on the cylindrical pole 1 will now be described with reference to FIGS. 2 to 7.

This device is provided in known manner with means for supplying a web made up of fiber slivers 8, 9, 10, . . . impregnated with resin in the unpolymerized state. Said web is fed to one end of the pole 1 at a predetermined angle which is initially equal to $\alpha_o$. The device is also provided with means for driving the pole 1 in rotation about its axis X—X' as well as means 11 whereby the slivers 8, 9, 10, . . . of fibers are displaced along the pole from the lower end to the upper end in a direction parallel to the axis X—X' of the pole 1 while this latter is being driven in rotation.

In accordance with the invention, the device comprises means whereby a plurality of parallel fiber slivers 8, 9, 10 . . . are fed simultaneously to the pole 1 and means whereby the spacing between said slivers is progressively increased during displacement of these latter between the bottom end and top end of the pole 1.

It is apparent from FIGS. 3 to 7 that the means mentioned in the foregoing comprise a threaded rod 12 which is mounted for rotation about its axis and is adapted to cooperate with a series of deformable parallelograms 13, 14, 15, . . . 20 (as shown in FIGS. 4 and 5). Said parallelograms are joined to each other and are adapted to carry at two of their opposite vertices a body such as the body 14a, 14b which is common to the adjacent parallelograms and is slidably mounted on the threaded rod 12. Each body 14a, 14b is provided with a fork 21a, 21b for guiding the displacement of a fiber sliver such as those designated by the references 7 and 9 (see FIGS. 6 and 7). The vertex of the deformable parallelogram 13 located at one end of the threaded rod 12 which is in turn located near the base of the pole 1 is rigidly coupled to a fixed point 22 whilst the vertex of the deformable parallelogram 20 which is adjacent to the other end of the threaded rod 12 is rigidly fixed to a body 23 which is engaged by screwing on the threaded rod 12.

Furthermore, the other two vertices such as 14c, 14d of each deformable parallelogram such as 14 are joined to each other by means of a diagonal rod 24 which is rigidly fixed to a body 25, said body 25 being located between the two bodies 14a, 14b which are engaged for axial displacement on the threaded rod 12.

The body 25 is slidably mounted on the threaded rod 12 and has a guide fork 26 for another fiber sliver 8 (see FIG. 7) located between the slivers 7 and 9.

Figure 6:
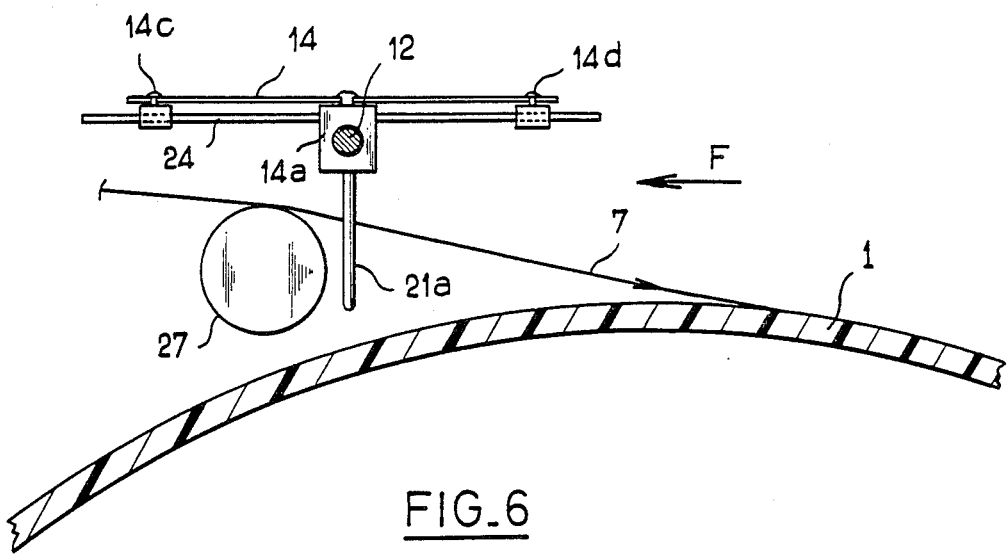
FIG. 6 is an end view of the device which also shows the cylinder for supporting the fiber slivers and the pole.
Figure 7:
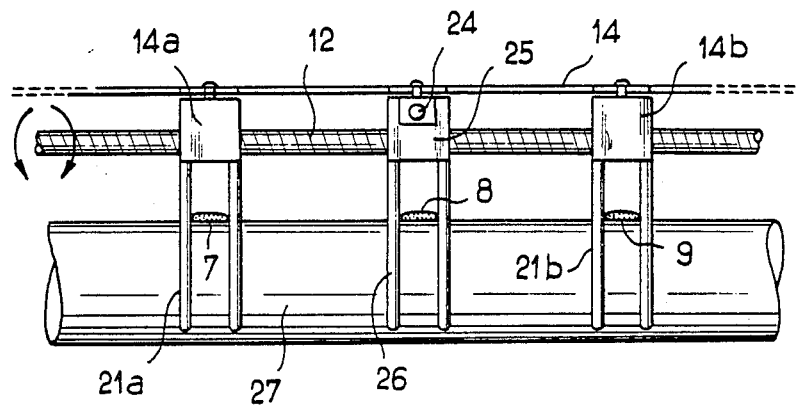
FIG. 7 is a view looking in the direction of the arrow F of FIG. 6.

Furthermore, it can be seen from FIGS. 3, 6 and 7 that, before being fed to the pole 1, the fiber slivers such as the slivers 7, 8, 9 pass over a cylinder 27 which has the effect of flattening the fiber slivers in the form of ribbons of small thickness or so-called tapes.

The operation of the device described in the foregoing is as follows:

At the outset, the device 11 is in the position shown in FIG. 4 in which the bodies such as those designated by the references 14a, 25, 14b and adapted to carry the forks 21a, 26, 21b for guiding the fiber slivers 7, 8, 9 . . . are placed in juxtaposed relation, with the result that the fiber slivers 7, 8, 9, . . . are practically contiguous.

These fiber slivers 7, 8, 9 which are guided by the forks 21a, 26, 21b and pre-impregnated with resin in the unpolymerized state are fed to the end of the pole 1 which corresponds to its base. The complete set of slivers 7, 8, 9, . . . makes an angle $\alpha_o$ with respect to a plane perpendicular to the axis X—X' of the pole 1 and extends over a length of pole equal to $L_0$.

By causing the pole 1 to rotate about the axis X—X', winding of the fiber slivers 7, 8, 9, . . . around the pole 1 takes place at the same time as displacement of the device 11 for guiding the fiber slivers in a direction parallel to the axis X—X' of the pole at a velocity $V_c$. During this displacement, the threaded rod 12 of the device 11 is caused to rotate so as to produce progressive deformation of the deformable parallelograms 13, 14, 15, . . . 20, thus having the effect of progressively increasing the distance between the forks 21a, 26, 21b which serve to guide the fiber slivers such as those designated by the references 7, 8, 9, . . . Said fiber slivers are thus progressively moved away from each other. At the same time, the angle made between these fiber slivers with respect to a plane perpendicular to the axis X—X' of the pole 1 is progressively increased. Thus, when the fiber slivers such as those designated by the references 7, 8, 9 arrive near the top end of the pole, the entire array of fiber slivers guided by the device 11 is inclined to the axis X—X' of the pole 1 at an angle equal to $\alpha$ which is larger than the initial angle $\alpha_o$ and this array of fibers or filaments covers the pole 1 over a length L which is also greater than the length of initial overlay Lo.

When this operation has been completed, winding of the filaments is continued but in the opposite direction or in other words from the top end to the bottom end of the pole 1. With this objective, it is preferable to displace the device 11 over a distance measured along the axis X—X' which corresponds approximately to the width of one fiber sliver and the angle $\alpha$ is reversed in order to ensure that, as the device 11 returns to the lower end of the pole, the fiber slivers cover the free spaces remaining between the slivers wound during the first traversal along the pole and that these slivers are crossed with respect to those of the previous layer.

It is thus possible to carry out a number of successive "round-trip" traversals with a minimum of one outward trip and one return trip.

For example, in the case of a pole having a circular and constant internal cross-sectional area, the definitions of the symbols used are as follows:

Lo=initial length of the device 11 for guiding the filament webs, $\alpha_o$=initial filament-winding angle, $X_o = 0$, *namely the initial position of the device* 11 *with respect to the axis X—X' of the pole,*

$e_o =$ *initial mean thickness of the filament web.*

Assuming that the device 11 occupies a given position x with respect to the axis X—X' of the pole, the following notations will be used:

L=length of the device 11, $\alpha$=filament-winding angle in this position, e=mean thickness of the filament web in this last-mentioned position.

Should it be desired to form a juxtaposed assembly of wound filament webs without overlapping at each turn, the following relations must be satisfied:

$$e = e_o \frac{tg\ \alpha_o}{tg\ \alpha}$$
$$L = \pi D\ tg\ \alpha$$

where D is the diameter of the pole.

It will now be considered that $\Omega$ denotes the rotational velocity of the pole in rd/s and that $V_c$ denotes the rate of travel of the device 11. If it is desired to wind the filament webs at an angle $\alpha$, the following relation must be satisfied:

$$V_c = \Omega \frac{D}{2}\ tg\ \alpha$$

In practice, the difference between the initial angle $\alpha_o$ and the final angle will be smaller than 10°.

As will readily be apparent, the motor for driving the threaded rod 12 in rotation can be controlled by a computer in order to control the expansion of the deformable parallelograms 13, 14, 15 . . . 20 at a speed which may be either constant or variable with stationary periods if necessary, as a function of the desired filament density distribution at a precise point of the length of the pole 1.

It should be understood that the invention is not limited to the examples of construction hereinabove described and that any number of modifications may accordingly be contemplated without thereby departing either from the scope or the spirit of the invention. Thus the pole may have any desired cylindrical crosssectional area.

A final point worthy of note is that the invention is equally applicable to poles other than electric power-line poles.

What is claimed is:

1. Apparatus for forming a filament-wound structure on a cylindrical pole (1) of plastic material having a longitudinal axis X—X', and having a bottom end to be fitted in the ground and a top end adapted to support loads, said pole being reinforced by said wound structure of filaments disposed in a plurality of layers, each filament having a winding angle ($\alpha$) with respect to a plane perpendicular to said axis X—X' of the pole (1), the adjacent filaments in each layer being spaced a distance apart, the winding angle ($\alpha$) of each filament and said distance between adjacent filaments progressively increasing from the bottom end to the top end of the pole, said apparatus comprising means for feeding a filament web impregnated with resin in the unpolymerized state to the pole (1) at a predetermined angle ($\alpha$) with respect to a plane perpendicular to said axis, means for driving the pole (1) in rotation about said axis, means for displacing the filament web along the pole from the bottom end to the pole end thereof in a direction parallel to the axis of the pole while this latter is being driven in rotation, said feeding means feeding a plurality of parallel fiber slivers (7, 8, 9) simultaneously to the pole (1), and means (13, 14, 15, . . . 20) for progressively increasing the spacing between said slivers during feeding of said slivers from the bottom end toward the top end of the pole in each said layers, said increasing means comprising a rotatably mounted threaded rod (12) in cooperating relation with a series of deformable parallelograms (13, 14, 15, . . . 20) adapted to carry at two of their opposite vertices a body (14a, 14b) which is slidably mounted on said threaded rod, each body being provided with a fork (21a, 21b) for guiding the displacement of a fiber sliver (7, 9), the vertex of the deformable parallelogram (13) located at one end of the threaded rod (12) being rigidly coupled to a fixed point (22) whilst the vertex of the deformable parallelogram (20) adjacent the other end of the threaded rod (12) is rigidly fixed to a body (23) which is engaged by screwing on said threaded rod (12).

2. Apparatus according to claim 1, wherein the other two vertices (14c, 14d) of each deformable parallelogram are connected to each other by means of a diagonal rod (24) rigidly to a body (25) located between the two bodies (14a, 14b) which are engaged on the threaded rod (12), said body (25) being slidably mounted on said threaded rod and provided with a guide fork (26) for another fiber sliver (8).

3. Apparatus according to claim 1, and means for progressively increasing said predetermined angle during feeding of said slivers from the bottom end toward the top end of the pole in each said layer.

4. Apparatus according to claim 1, said progressively increasing means also progressively decreasing the spacing between said slivers from the top end toward the bottom end of the pole in each said layer.

5. Apparatus according to claim 3, said means for progressively increasing the angle also progressively decreasing said angle from the top end toward the bottom end of the pole in each said layer.

* * * * *